United States Patent [19]
Kajitani

[11] Patent Number: 6,057,983
[45] Date of Patent: *May 2, 2000

[54] FLYING HEAD SLIDER IN WHICH ADHESION OF A LIQUID DUST IS SUPPRESSED

[75] Inventor: Hiroshi Kajitani, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/956,793

[22] Filed: Oct. 23, 1997

[30] Foreign Application Priority Data

Oct. 23, 1996 [JP] Japan .................................. 8-280670

[51] Int. Cl.⁷ ....................................................... G11B 5/60
[52] U.S. Cl. ............................................................ 360/103
[58] Field of Search ............................................. 360/103

[56] References Cited

U.S. PATENT DOCUMENTS

| | | | |
|---|---|---|---|
| 5,430,591 | 7/1995 | Takeuchi et al. | 360/103 |
| 5,568,981 | 10/1996 | Nepela et al. | 360/103 |
| 5,583,722 | 12/1996 | Dorius et al. | 360/103 |

*Primary Examiner*—Robert S. Tupper
*Attorney, Agent, or Firm*—Sughrue, Mion, Zinn, Macpeak & Seas, PLLC

[57] ABSTRACT

In a flying head slider for holding an electro-magnetic transducer to have a given distance from a magnetic recording medium with air flow caused by rotation of the magnetic recording medium, a flow adjusting arrangement adjusts the air flow to reduce differential pressure of the air flow. The flying head has a principal surface facing the magnetic recording medium. The air flow is induced between the principal surface and the magnetic recording medium to float the flying head slider from the magnetic recording medium.

11 Claims, 13 Drawing Sheets

FLYING HEAD SLIDER IN WHICH ADHESION OF A LIQUID DUST IS SUPPRESSED

BACKGROUND OF THE INVENTION

The present invention relates to a magnetic disk drive and, in particular, to a flying head slider for use in the magnetic disk drive.

In the conventional magnetic disk drives, improvement in magnetic characteristic of a magnetic head and a recording medium or a magnetic disk and shortening of a distance between a gap tip of the magnetic head and a surface of the recording medium, that is, a magnetic spacing, were carried out for improving the recording density.

However, in the recent magnetic disk drives, in general, the physical minimum distance between the magnetic head and the magnetic recording medium has reached about 30 nm. This distance is comparable with the surface roughness of the recording medium. Under the circumstances, it is highly possible that reduction in flying height of the flying head slider induces a phenomenon of high-speed sliding contact between the flying head slider and the magnetic recording medium due to the limit in followability of the flying head slider against fluctuation of an air bearing function upon high-speed movement to a target position on the magnetic recording medium, that is, upon the so-called track seek, vibration of the flying head slider supporting system and vertical swelling of the magnetic recording medium.

These fluctuation factors of the flying height of the slider can be largely reduced by utilizing the negative pressure for the fluid bearing of the slider to enhance rigidity of the air bearing, thereby improving the medium followability of the slider.

Further, by achieving the sufficient rigidity based on the fluid bearing effect, the pressure load applied to the flying head slider by the suspension can be reduced. Moreover, since the take-off velocity of the slider is improved following enlargement of the air bearing surface, the durability can also be largely improved against the sliding contact upon CSS (contact/start/stop).

However, for adopting a read only head (which is so called MR head) utilizing a magneto-resistive effect, which holds the key to the high recording density and is excellent in S/N of read back signal, the flying height uniformity between inner and outer regions on the disk is more required than the case where the recording and reproduction are carried out using only a thin film head whose reproduction output characteristic depends on the rotation speed of the magnetic recording medium. This is caused by non-dependence of the reproduction output relative to the rotation speed, and hence, those regions where the probability of damage on the magnetic recording medium, namely, the magnetic disk is high due to the high-speed sliding contact, have been increased.

Referring to FIGS. 15 to 17, description will be made regarding typical flying head sliders utilizing the negative pressure, respectively. Specifically, FIG. 15 shows a two lane flying head slider 1, FIG. 16 shows a center rail flying head slider 1, and FIG. 17 shows a center pad flying head slider 1. In each of these figures, numeral 2 denotes a main recess, numerals 3 and 4 denoting a pair of side rails forming the main recess 2 on the slider 1, numeral 5 denoting a cross rail connecting between the side rails 3 and 4, and numeral 6 denoting a chamfer provided at an outer upper portion of the cross rail 5. In FIG. 16, numeral 7 denotes a center rail dividing the recess 2 into a pair of recesses 2a and 2b. Further, in FIG. 17, numeral 8 denotes a center pad disposed in the main recess 2 at a lower middle portion thereof.

In case of the two lane flying head slider 1 shown in FIG. 15, a magnetic head can be arranged at a radially outer side relative to a magnetic recording medium (not shown). Thus, it is excellent in recording capacity and, since the negative pressure can be fully ensured, it is suitable for the high-speed rotation. However, there are disadvantages that the limitation in design is large relative to the flying height uniformity and the flying attitude and that the minimum flying height fluctuation relative to disturbance is slightly greater.

On the other hand, in case of the center rail flying head slider 1 shown in FIG. 16 and the center pad flying head slider 1 shown in FIG. 17, it is easy to suppress the flying height fluctuation relative to disturbance and, since the limitation to the flying attitude is relaxed, it is easy to pursue the flying height uniformity.

However, since the side rails 3 and 4 are each shorter than the overall length of the slider 1, the positive pressures generated at air flow-out ends (trailing edges) of the side rails 3 and 4 are considerably lower than those in the two lane flying head slider shown in FIG. 15.

Particularly, since the positive pressure generated at the center pad 8, where the area is small and the flying height is small, frequently becomes more than twice the positive pressure generated at an air flow-out end of the two lane slider, it happens that a pressure differential at the air flow-out end reaches even 4 to 5 atm. Further, since the air flow velocity reaches 10 to 30 m/S, it is possible that moisture in the air or vaporized lubricant in the air for protecting the recording medium is liquefied due to the pressure fluctuation.

Further, it is also possible that the lubricant for protection of the recording medium adheres to the air bearing surface of the flying head slider upon CSS or upon the high-speed sliding contact with the magnetic recording medium and then moves along the air bearing surface due to the air flow so as to stay at the air flow-out end.

The foregoing phenomena may also occur similarly at an air flow-out end of the cross rail 5 which generates the negative pressure. In particular, although the positive pressure at this air flow-out end is not so high, since the negative pressure immediately after the cross rail 5 becomes maximum, a pressure differential is large. Further, there occur regions where the air flow velocity is small. Accordingly, a possibility is very high that introduced dust remains in such regions.

Specifically, although the flying head sliders utilizing the negative pressure have been predominant in recent years, since the pressure in the negative pressure generating region is lower than the ambient pressures, very small dust which is generated in the magnetic disk drive is liable to be sucked. Further, at the interface between the head and the disk in the foregoing near contact region, it is considered that the lubricant for the slider and the lubricant for the medium surface are constantly contacting with each other. Under the circumstances, there have been demands for flying head sliders which can prevent accumulation of the dust on the air bearing surface at a contact region thereof and at a small flying height region thereof near the contact region.

SUMMARY OF THE INVENTION

It is therefore an object of the present invention to provide a flying head slider in which adhesion of a liquid dust is suppressed.

Other objects of this invention will become clear as the description proceeds.

According to one aspect of the present invention, there is provided a flying head slider for holding an electro-magnetic transducer to have a given distance a magnetic recording medium. The flying head slider comprises a principal surface facing the magnetic recording medium, flying means formed on the principal surface for flying the flying head slider from the magnetic recording medium with air flow induced between the principal surface and the magnetic recording medium by rotation of the magnetic recording medium, the air flow having differential pressure caused by the flying means, and flow adjusting means connected to the flying means for adjusting the air flow to reduce the differential pressure.

BRIEF DESCRIPTION OF THE DRAWING

FIGS. 5A, 5B, and 5C are diagrams showing a flying head slider according to another preferred embodiment of the present invention, wherein FIG. 5A is a schematic side view of the slider, FIG. 5B being a schematic rear view of the slider showing an air flow-in end thereof, FIG. 5C being a diagram schematically showing the flying attitude of the flying head slider;

FIGS. 7A and 7B are diagrams showing a flying head slider according to another preferred embodiment of the present invention, wherein FIG. 7A is a diagram showing a center pad, FIG. 7B being a sectional view taken along line VII—VII in FIG. 7A;

FIGS. 8A and 8B are diagrams showing a flying head slider according to another preferred embodiment of the present invention, wherein FIG. 8A is a diagram showing a center pad, FIG. 8B being a sectional view taken along line VIII—VIII in FIG. 8A;

FIGS. 9A and 9B are diagrams showing a flying head slider according to another preferred embodiment of the present invention, wherein FIG. 9A is a diagram showing the whole structure of the flying head slider, FIG. 9B being a sectional view of a center pad taken along line IX—IX in FIG. 9A;

FIGS. 10A and 10B are diagrams showing a flying head slider according to another preferred embodiment of the present invention, wherein FIG. 10A is a diagram showing a relationship between the slider and a magnetic recording medium, FIG. 10B being a diagram showing the whole structure of the slider;

FIGS. 12A and 12B are diagrams showing a flying head slider according to another preferred embodiment of the present invention, wherein FIG. 12A is a diagram showing the whole structure of the flying head slider, FIG. 12B being a sectional view of a cross rail taken along line XII—XII in FIG. 12A;

FIGS. 13A and 13B are diagrams showing a flying head slider according to another preferred embodiment of the present invention, wherein FIG. 13A is a diagram showing the whole structure of the flying head slider, FIG. 13B being a sectional view taken along line XIII—XIII in FIG. 13A;

FIGS. 14A and 14B are diagrams showing a flying head slider according to another preferred embodiment of the present invention, wherein FIG. 14A is a diagram showing the whole structure of the flying head slider, FIG. 14B being a sectional view of a center rail taken along line XIV—XIV in FIG. 14A;

DESCRIPTION OF THE PREFERRED EMBODIMENTS

Figure 1:
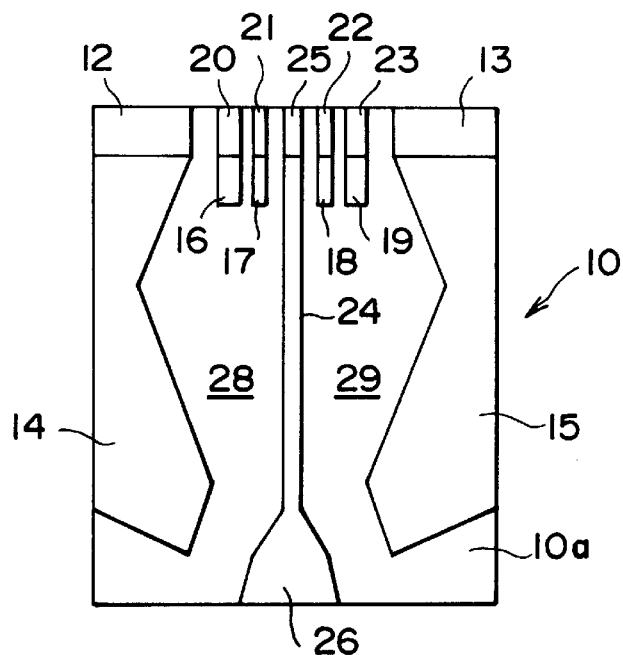
FIG. 1 is a diagram showing a flying head slider according to a preferred embodiment of the present invention.

Referring to FIG. 1, the description will be made as regards a flying head slider according to a preferred embodiment of the present invention. The flying head slider is for holding an electro-magnetic transducer which is opposite to a magnetic recording medium to have a given distance therebetween.

In FIG. 1, the flying head slider is designated by a reference numeral 10 and has a principal surface 10a facing the magnetic recording medium. The flying head slider 10 comprises a flying arrangement which is formed on the principal surface 10a and is for flying the flying head slider 10 from the magnetic recording medium with air flow induced between the principal surface 10a and the magnetic recording medium by rotation of the magnetic recording medium. In the manner which will later become clear, the air flow is directed from an upstream portion of the principal surface 10a towards a downstream portion thereof opposed to the upstream portion.

The flying arrangement comprises a pair of side rails 14 and 15, a cross rail in the form of divided cross rail elements 16 to 19, a center rail 24, and a center pad 26.

The side rails 14 and 15 have leading portions 12 and 13 at the upstream portion of the principal surface 10a or at the air flow-in end (leading edge) of the slider 10, respectively. The side rails 14 and 15 have a space left therebetween in a first direction intersecting the air flow. Each of the side rails 14 and 15 extends from the upstream portion in a second direction which is along the air flow. Each of the side rails 14 and 15 has a length shorter than the overall length of the slider 10.

The cross rail is in the form of the divided cross rail elements 16 to 19 at the upstream portion of the principal surface 10a between the side rails 14 and 15 and is separated from the side rails 14 and 15. A space is left as an air path between the cross rail and each of the side rails 14 and 15. The divided cross rail elements 16 to 19 are extend in the second direction to have gaps which are left as air paths between adjacent ones thereof. A combination of these air paths is referred to as a flow adjusting arrangement.

The cross rail elements 16 to 19 are located at the air flow-in side relative to the overall length of the slider 10. The cross rail elements 16 to 19 have leading portions 20 to 23 at the air flow-in end of the slider 10, respectively.

The center rail 24 have a leading portion 25 at the air flow-in end of the slider 10. The center rail 24 is provided with a center pad 26 in a continuous manner. The center pad 26 is located at the downstream portion of the principal surface 10a or at the air flow-out end (trailing edge) of the slider 10 at a middle portion thereof and hold the magnetic transducer in the manner known in the art.

Further, numerals 28 and 29 denote main recesses separated by the center rail 24 and the center pad 26. Each of the recesses 28 and 29 has a depth or step of not greater than 15 $\mu$m. In other words, the step between the surface level of the rails 14 to 19 and 24 and the center pad 26 and the surface level of portions other than those rails and pad is set to be not greater than 15 $\mu$m.

Figure 2:
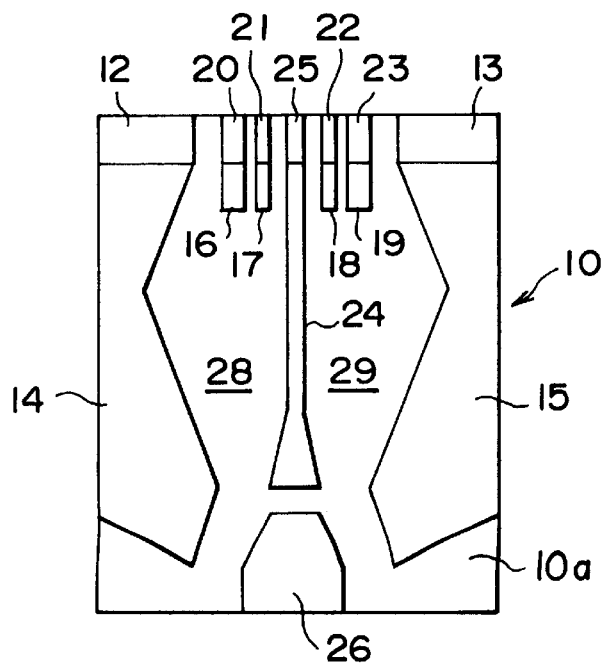
FIG. 2 is a diagram showing a modification of the flying head slider shown in FIG. 1.

Referring to FIG. 2, the description will be directed to a modification of the slider 10 shown in FIG. 1. Similar parts are designated by like reference numerals. In the slider 10 of FIG. 2, the center rail 24 and the center pad 26 are separated from each other in the second direction.

Figure 3:
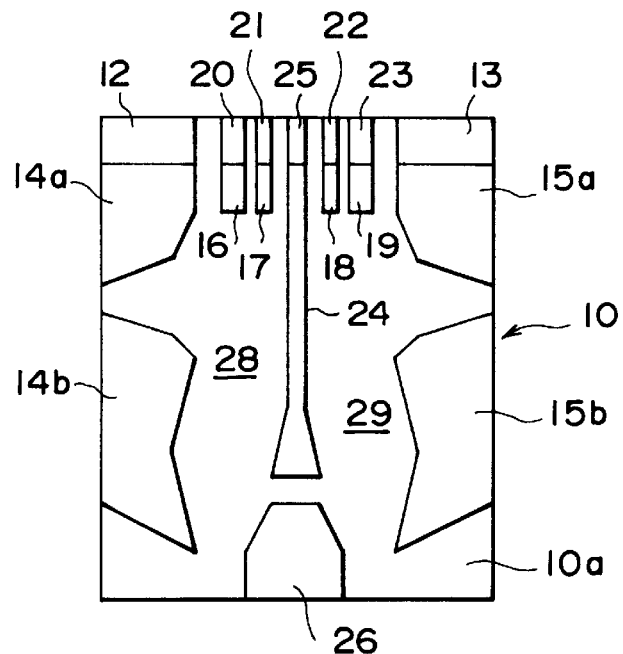
FIG. 3 is a diagram showing a modification of the flying head slider shown in FIG. 2.

Referring to FIG. 3, the description will be directed to a modification of the slider 10 shown in FIG. 2. Similar parts are designated by like reference numerals. In the slider 10 of FIG. 3, the side rail 14 is divided into two guide rails 14a and 14b, the side rail 15 being divided into two guide rails 15a and 15b.

Figure 4:
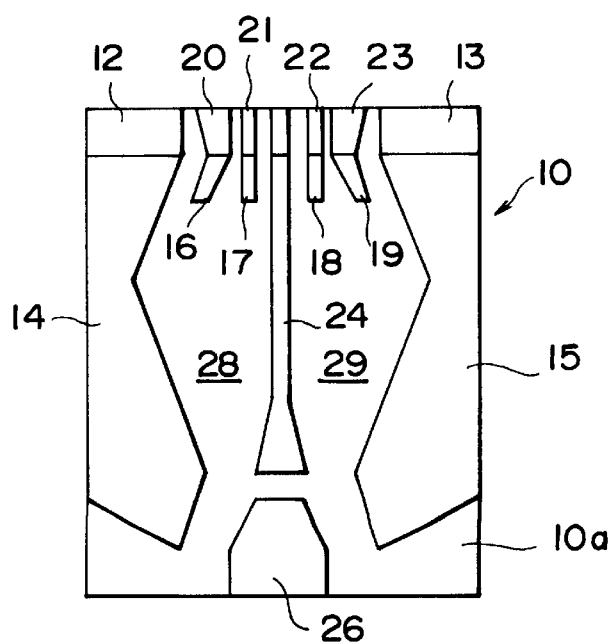
FIG. 4 is a diagram showing another modification of the flying head slider shown in FIG. 2.

Referring to FIG. 4, the description will be directed to a further modification of the slider 10 shown in FIG. 2. Similar parts are designated by like reference numerals. In the slider 10 of FIG. 4, the intervals between the cross rail elements 16 and 17 and between the cross rails 18 and 19 are not constant. In addition, the cross rail elements 16 to 19 have different shapes.

According to each of the sliders 10 shown in FIGS. 1 to 4, since there is no compression or expansion of the air flow at dividing or separating regions among the cross rail elements 16 to 19, the uniform air flow can be achieved. Thus, the probability of adhesion of liquid dust to the low flying height region near the center pad 26 can be reduced.

Figure 5A:
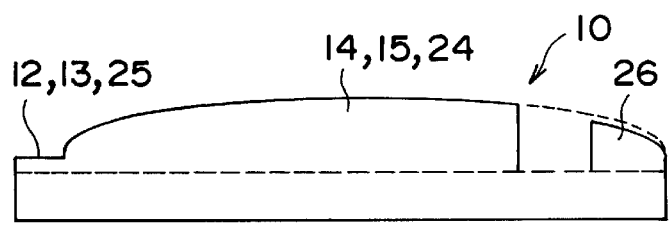
Figure 5B:
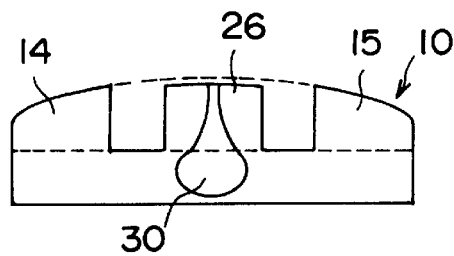
Figure 5C:
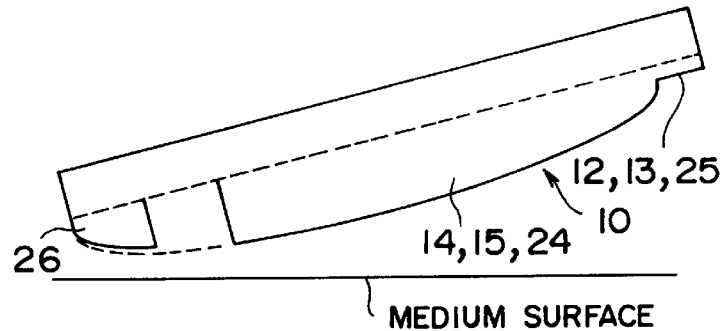

Referring to FIG. 5A to FIG. 5C in comparison with FIGS. 6A to 6D, the description will be made as regards a flying head slider 10 according to another preferred embodiment of the present invention. The flying head slider 10 comprises similar parts designated by like reference numerals. In the slider 10, when applying a surface-curving process to the side rails 14 and 15, the center rail 24, and the center pad 26, the center pad 26 is processed to be smaller than a contour as defined by a virtual curved surface. A contour of the center pad 26 serves as the flow adjusting arrangement.

Figure 5D:
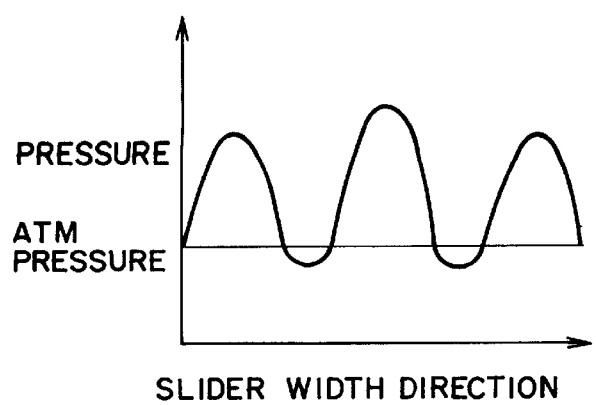
FIG. 5D is a diagram showing a pressure distribution at air flow-out ends of side rails and a center pad of the flying head slider shown in FIGS. 5A to 5C.
Figure 6A:
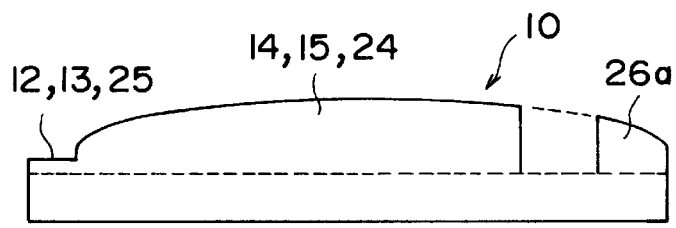
FIGS. 6A, 6B, 6C, and 6D are diagrams corresponding to FIGS. 5A, 5B, 5C, and 5D, respectively, for a conventional flying head slider.
Figure 6B:
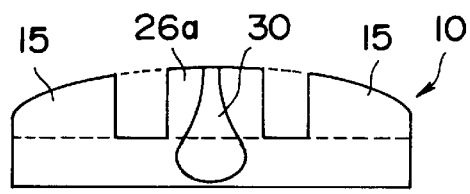
Figure 6C:
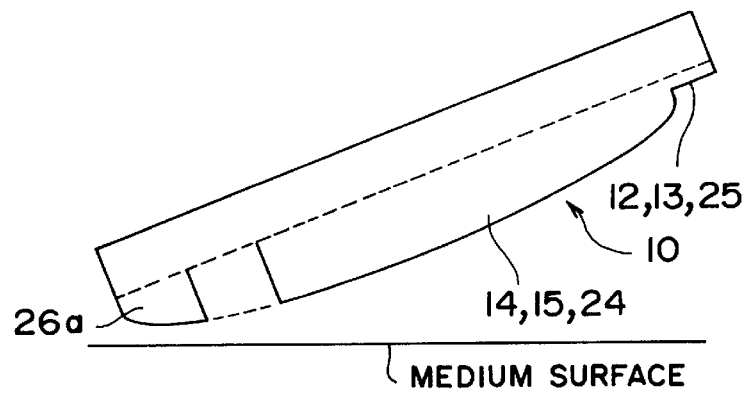
Figure 6D:
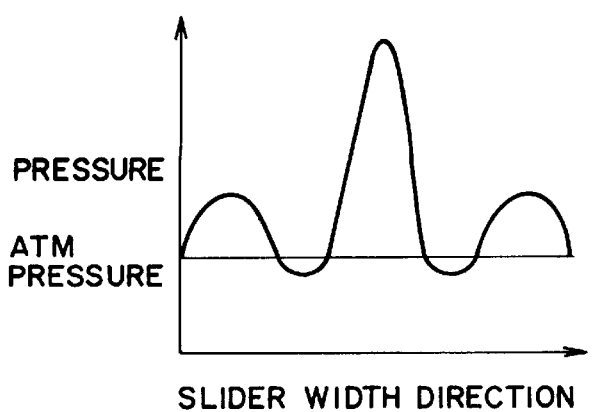

With this arrangement, a minimum flying height difference between the center pad 26 and the side rails 14 and 15 during floatation can be reduced so that the produced pressure can be dispersed or distributed as shown in FIG. 5D. Thus, the generation of liquid dust can be suppressed. This is clear from comparison with FIGS. 6A to 6D. In FIGS. 5B and 6B, numeral 30 denotes the magnetic transducer held by the center pad 26.

The arrangement of FIGS. 5A–5C is applicable to each of the sliders 10 of FIGS. 1–4.

Figure 7A:
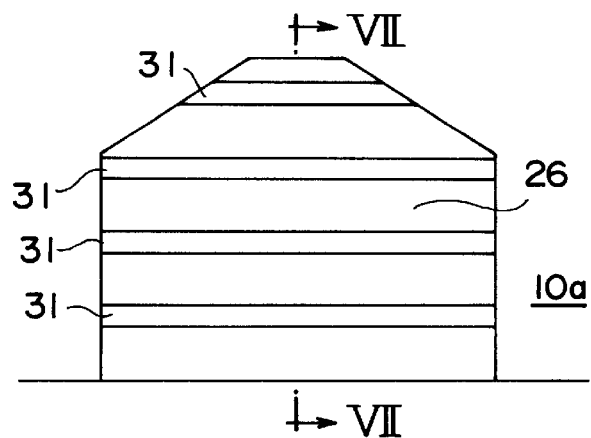
Figure 7B:
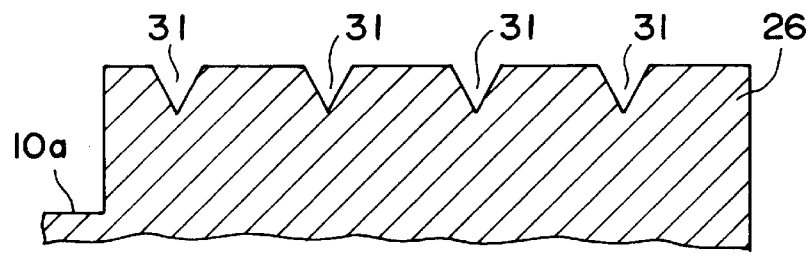
Figure 7C:
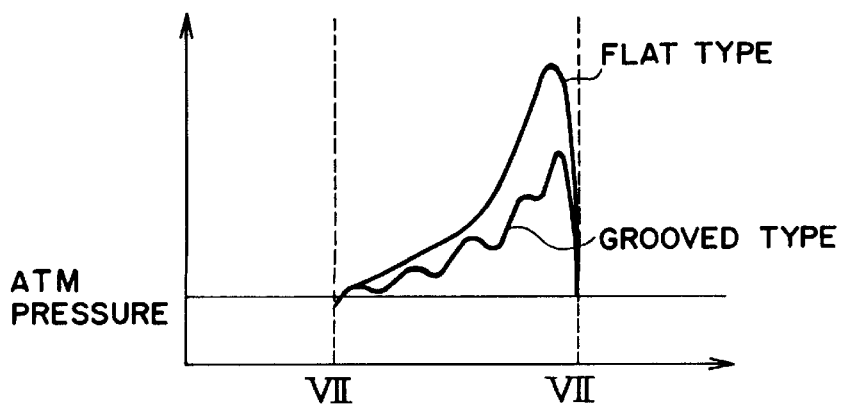
FIG. 7C is a characteristic diagram showing differences in produced pressure between a case with grooves on the center pad and a case with no grooves (flat type)

Referring to FIGS. 7A and 7B, the description will be made as regards a flying head slider according to another preferred embodiment of the present invention. In the slider, the cross rail 26 has a plurality of grooves 31 formed as pressure paths on a top surface thereof. The grooves 31 are arranged at a uniform distance. As clear from FIG. 7C, the produced maximum pressure can be reduced by providing the grooves 31 on the center pad 26. This means that the grooves 31 serve as the flow adjusting arrangement.

The foregoing arrangement of FIGS. 7A and 7B is applicable to each of the sliders 10 of FIGS. 1–4.

Figure 8A:
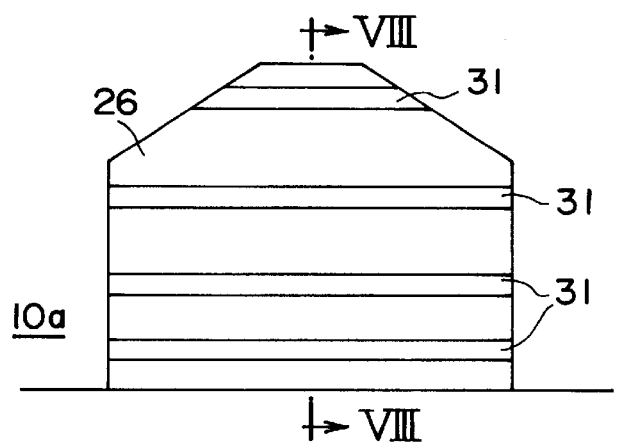
Figure 8B:
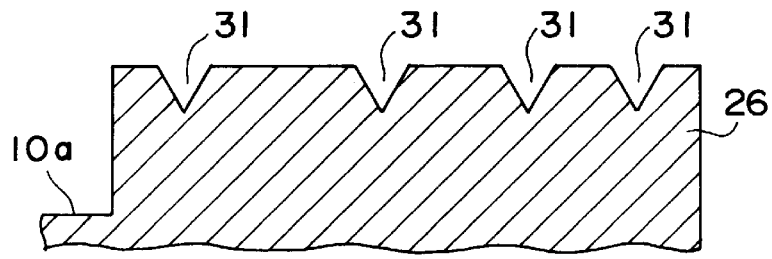
Figure 8C:
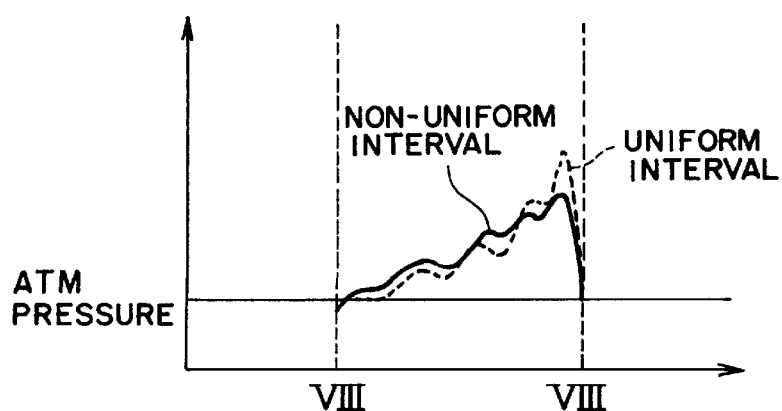
FIG. 8C is a characteristic diagram showing differences in produced pressure between a case with the grooves at uniform intervals and a case with the grooves at non-uniform intervals.

Referring to FIGS. 8A and 8B, the description will be made as regards a modification of the flying head slider of FIGS. 7A and 7B. In the modification, the grooves 31 are arranged at non-uniform distances. As clear from FIG. 8C, the modification is better in effect than the slider of FIGS. 7A and 7B.

The foregoing arrangement of FIGS. 8A and 8B is applicable to each of the sliders 10 of FIGS. 1–4.

Figure 9A:
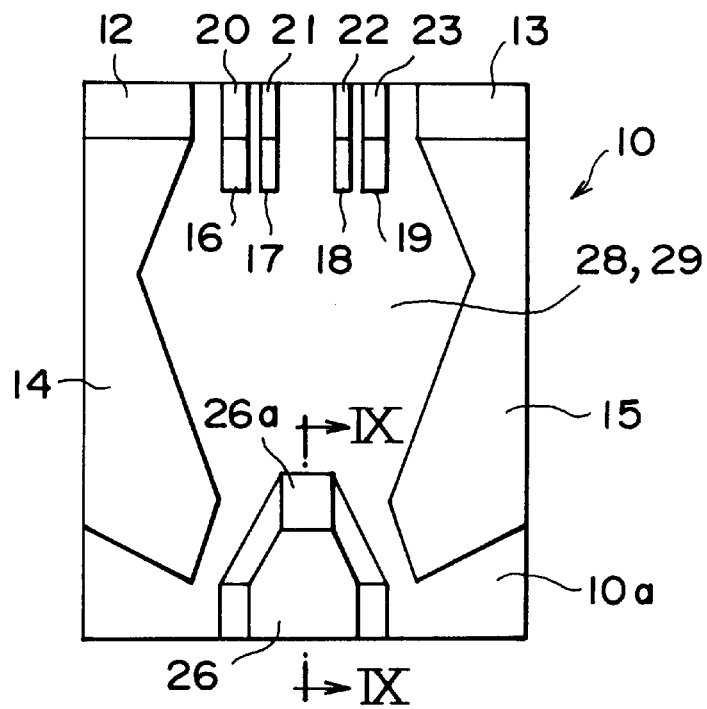
Figure 9B:
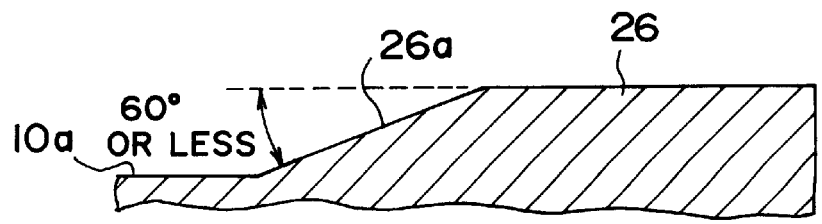

Referring to FIGS. 9A and 9B, the description will be made as regards a flying head slider according to another preferred embodiment of the present invention. Similar parts are designated by like reference numerals. In he slider 10 of FIGS. 9A and 9B, the center pad 26 has a slant surface 26a given a relatively small inclination (not greater than 60°). The slant surface 26a is referred to as the flow adjusting arrangement.

With this structure, the change in pressure and air flow velocity can be gradual, so that the liquid dust is prevented from staying. In this connection, if a step of the center pad 26 at an air flow-in side (namely, leading side) thereof is vertical, the pressure and the air flow velocity at the step are both low, so that the liquid dust tends to be accumulated.

The foregoing arrangement of FIGS. 9A and 9B is applicable to each of the sliders 10 of FIGS. 1–4.

Figure 10A:
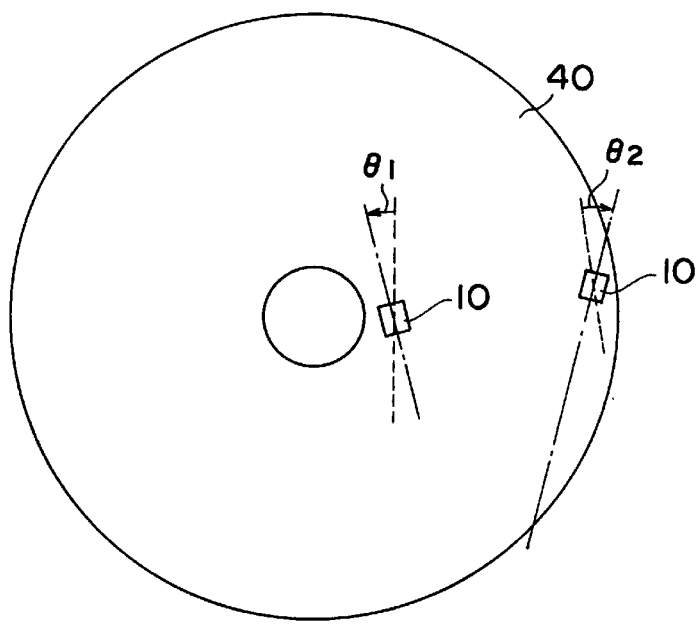
Figure 10B:
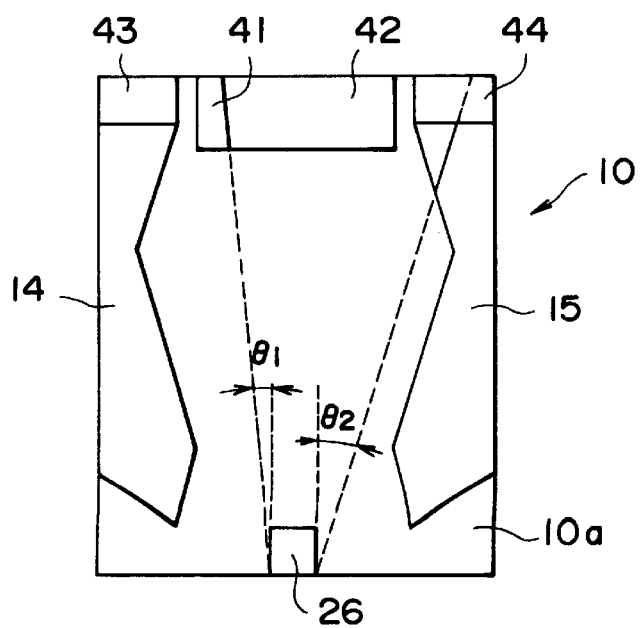

Referring to FIGS. 10A and 10B, the description will be made as regards a flying head slider 10 according to another preferred embodiment of the present invention. Similar parts are designated by like reference numerals.

As shown in FIG. 10A, a rotary actuator is used in the conventional magnetic disk drive. In this event, an angle between a longitudinal direction of the slider 10 and a tangent direction of the recording medium 40 is not constant at the inner and outer sides of the recording medium 40. Specifically, an inner side yaw angle $\theta 1$ is about 10°, while an outer side yaw angle $\theta 2$ is about –20°.

In view of the above, as shown in FIG. 10B, steps 42 and 44 are provided on the surfaces of the cross rail 41 and the side rails 14 and 15 at regions which are defined by the foregoing angles $\theta 1$ and $\theta 2$ as seen from the center pad 26. With this structure, the negative pressure generating efficiency is not so lowered and the air flow reaching the center pad 26 is not so reduced over the whole surface of the recording medium 40. Thus, the generation of the liquid dust and the adhesion probability thereof can be suppressed and reduced. The steps 42 and 44 are referred to as the flow adjusting arrangement.

The hatched portions in FIG. 10B show the air bearing surfaces located essentially at the same surface level. Further, numerals 43 and 44 represent chamfers, respectively.

Figure 11:
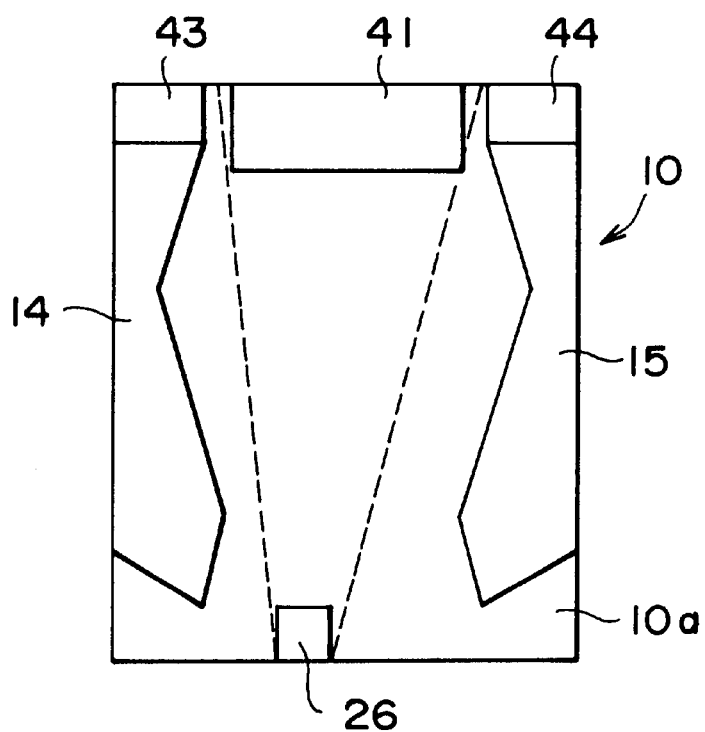
FIG. 11 is a diagram showing a flying head slider according to another preferred embodiment of the present invention.

Referring to FIG. 11, the description will be made as regards a flying head slider according to another preferred embodiment of the present invention. Similar parts are designated by like reference numerals. In the slider 10, the center pad 26 is offset or dislocated from the lateral center of the slider 10 in the first direction. It is to be noted that the cross rail 41 is formed lower than the side rails 14 and 15 and a center pad 26. Such a lower cross rail is referred to as the flow adjusting arrangement.

With this structure, the cross rail 41 is ensured lateral symmetry thereof.

Figure 12A:
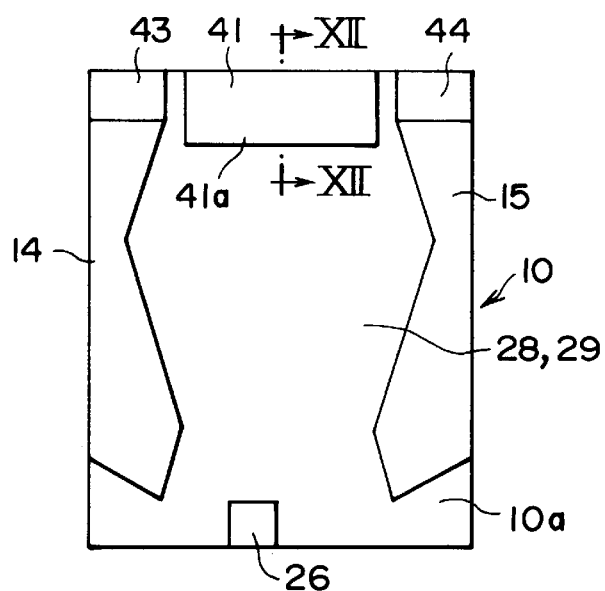
Figure 12B:
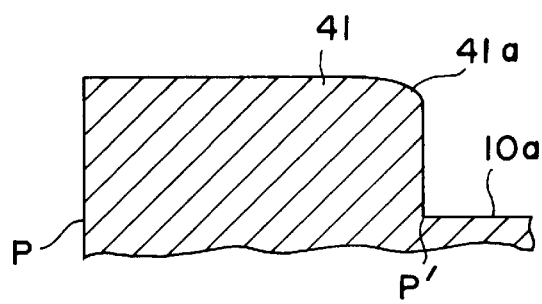

Referring to FIGS. 12A and 12B, the description will be made as regards a flying head slider according to another preferred embodiment of the present invention. Similar parts are designated by like reference numerals. In the slider 10, the cross rail 41 is formed lower than the side rails 14 and 15 and a center pad 26 and has a chamfer portion 41a as shown in FIG. 12B.

Figure 12C:
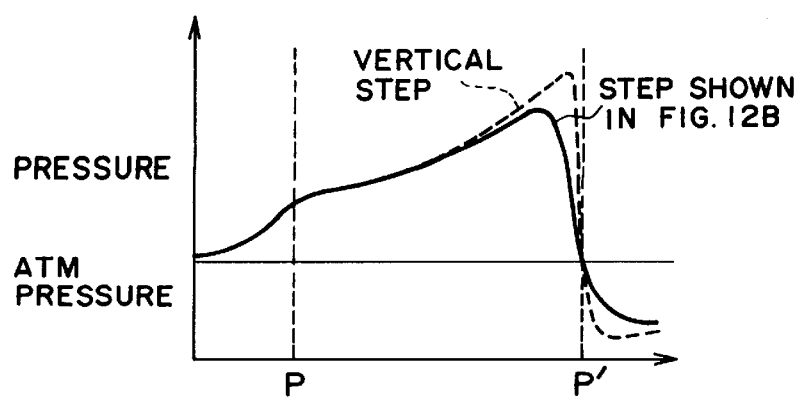
FIG. 12C is a characteristic diagram showing a pressure distribution when a step of the cross rail is vertical and a pressure distribution when the step has a cross section shown in FIG. 12B.

With this structure, the pressure distribution identified by a solid line in FIG. 12C can be achieved. Accordingly, the pressure fluctuation difference of the air flow can be reduced. Then, the generation of the liquid dust can be suppressed.

Figure 13A:
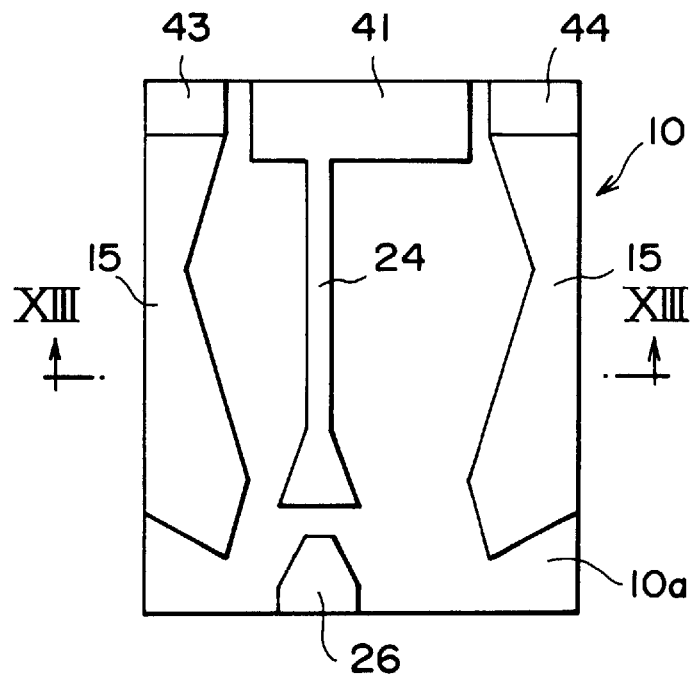
Figure 13B:
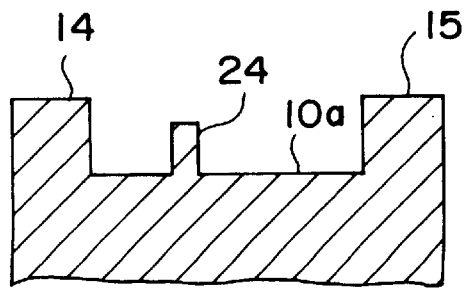

Referring to FIGS. 13A and 13B, the description will be made as regards a flying head slider according to another preferred embodiment of the present invention. Similar parts are designated by like reference numerals.

In the slider 10, the cross rail 41 has a reduced height over the length thereof as compared with the side rails 14 and 15 and with the center pad 26. The center rail 24 also has a reduced height over the length thereof and is connected to the cross rail 41. The height of the center rail 24 is equal to that of the cross rail 41. A combination of the cross rail and the center rail 24 is referred to as the flow adjusting arrangement.

By providing the height reduced center rail 24, the slow air flow at the deep recess regions is prevented from reaching the center pad 26. Thus, the probability of dust adhesion onto the step surface of the center pad 26 can be reduced.

Figure 14A:
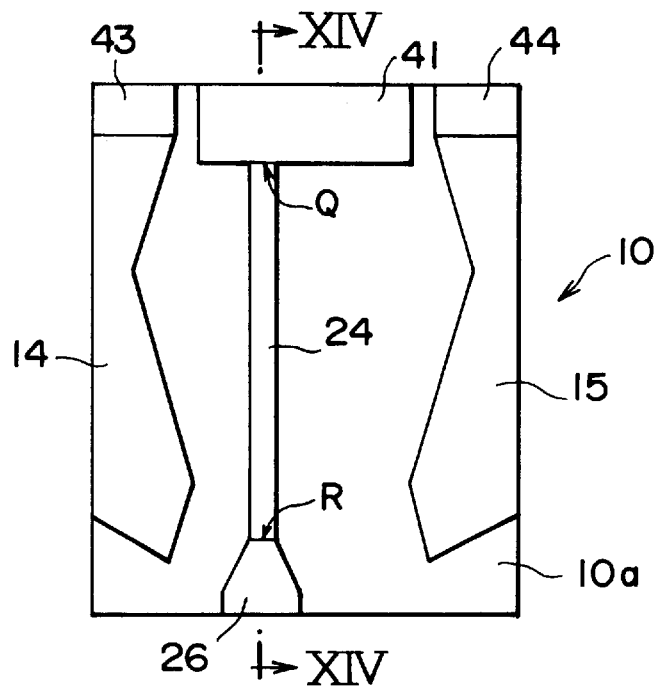
Figure 14B:
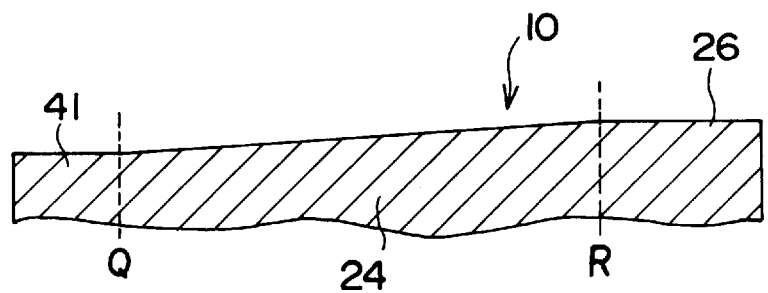
Figure 15:
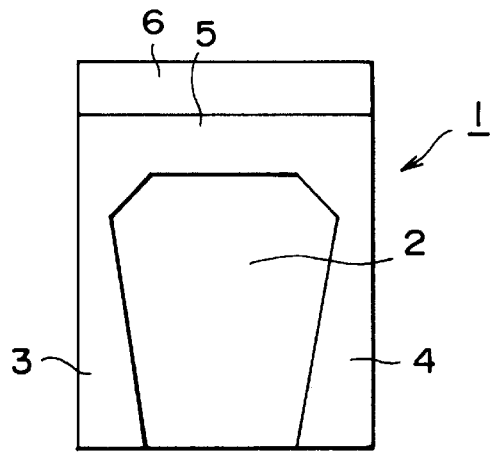
FIG. 15 is a diagram showing a typical air bearing surface shape of a conventional two lane negative pressure slider.
Figure 16:
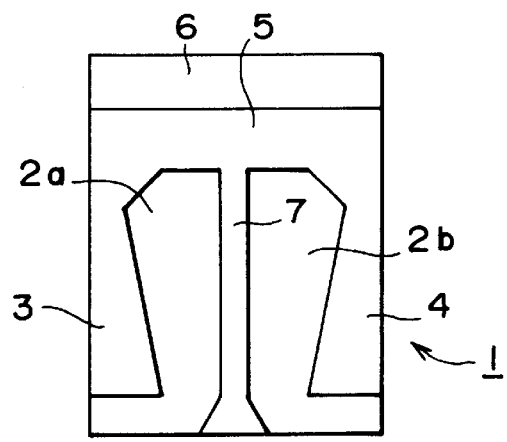
FIG. 16 is a diagram showing a typical air bearing surface shape of a conventional center rail negative pressure slider.
Figure 17:
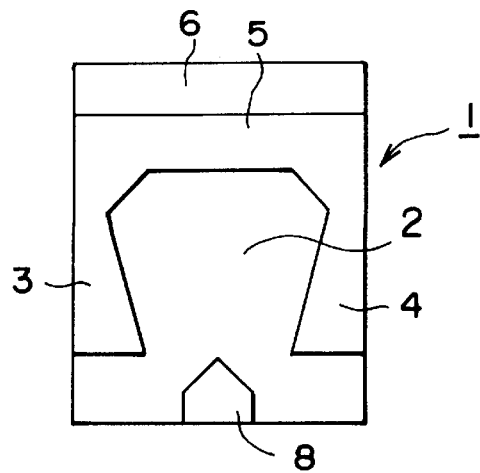
FIG. 17 is a diagram showing a typical air bearing surface shape of a conventional center pad negative pressure slider.

Referring to FIGS. 14A and 14B, the description will be made as regards a flying head slider according to another preferred embodiment of the present invention. Similar parts are designated by like reference numerals.

In the slider 10, the cross rail 41 has a reduced height over the length thereof as compared with the side rails 14 and 15 and with the center pad 26. The center rail 24 is slightly slant to the principal surface 10a. In other words, the height of the center rail 24 is not uniform over the length thereof. Also with this structure, the pressure fluctuation and the air flow fluctuation can be reduced. Therefore, the generation of the liquid dust and the adhesion probability thereof can be suppressed and reduced.

As described above, it is possible to provide the magnetic disk drive which is capable of suppressing the generation of the liquid dust, reducing the probability of adhesion of the liquid or other dust, enhancing the reliability of the magnetic head in operation, and improving the recording density.

While the present invention has thus far been described in conjunction with the preferred embodiments thereof, it will readily be possible for those skilled in the art to put this invention into practice in various other manners. For example, the flying head slider may be made of any material as long as it is considered appropriate relative to a material of the protective film of the magnetic recording medium and a lubricant on the magnetic recording medium. Each of the leading portions of the side rails may be in the form of a chamfer or a slant surface or a recess having a depth or step of not greater than 2 µm. The number of the side rails may be greater than two. Each of the leading portions of the cross rails may be in the form of a chamfer or a slant surface or a recess having a depth or step of not greater than 2 µm. The leading portion of the center rail may be in the form of a chamfer or a slant surface or a recess having a depth or step of not greater than 2µm. A plurality of holes may be provided instead of or in addition to the grooves.

What is claimed is:

1. A flying head slider for holding an electro-magnetic transducer to have a given distance from a magnetic recording medium, said slider comprising:

a principal surface facing said magnetic recording medium;

floating means formed on said principal surface for floating said flying head slider from said magnetic recording medium with air flow induced between said principal surface and said magnetic recording medium, said air flow having differential pressure caused by said floating means; and flow adjusting means connected to said floating means for adjusting said air flow to reduce said differential pressure;

wherein said principal surface has an upstream portion and a downstream portion opposed to said upstream portion, said air flow being directed from said upstream portion towards said downstream portion, wherein said floating means comprises:

a pair of side rails formed on said principal surface to have a space left therebetween in a first direction intersecting said air flow, each of said side rails extending from said upstream portion in a second direction which is along said air flow; and a cross rail formed at said upstream portion of the principal surface and extending between said side rails in said first direction, said cross rail having at least a portion distinct from said side rails;

wherein said portion of said cross rail distinct from said side rails is divided into a plurality of cross rail elements, wherein first gaps are formed between said cross rail elements and second gaps are formed between said side rails and said portion of said cross rail distinct from said side rails, said cross rail elements and said first and second gaps extending in said second direction, and wherein said air flow is directed from said upstream portion to said downstream portion via said first and second gaps.

2. A flying head slider as claimed in claim 1, wherein said floating means further comprises a center pad formed at said downstream portion of the principal surface for holding said electro-magnetic transducer, said center pad facing said space in said second direction.

3. A flying head slider as claimed in claim 2, wherein said gaps of said cross rail elements are an air path serving as said flow adjusting means.

4. A flying head slider as claimed in claim 2, wherein said center pad has a pressure path serving as said flow adjusting means.

5. A flying head slider as claimed in claim 4, wherein said pressure path has a plurality of grooves formed on a surface of said center pad.

6. A flying head slider as claimed in claim 5, wherein said grooves are arranged at a uniform distance.

7. A flying head slider as claimed in claim 5, wherein said grooves are arranged at non-uniform distances.

8. A flying head slider as claimed in claim 2, wherein said center pad has a slant surface which is slant to said principal surface and serves as said flow adjusting means.

9. A flying head slider as claimed in claim 8, wherein said slant surface has an inclination of not greater than 60°.

10. A flying head slider comprising:

a principal surface facing a magnetic recording medium, in which said principal surface floats a given distance above said magnetic recording medium by an air flow induced between said principal surface and said magnetic recording medium when said magnetic recording medium rotates, said principal surface having an upstream portion and a down stream portion, where said air flow is directed from said upstream portion to said downstream portion;

a pair of side rails formed on said principal surface to have a space left therebetween in a first direction which intersects said air flow, each of said side rails extending from said upstream portion in a second direction which is along said air flow;

a center pad formed at said downstream portion and facing said space in said second direction;

a center rail extending between said side rails in said second direction from said upstream portion to said downstream portion towards said center pad; and a cross rail formed at said upstream portion of the principal surface and extending between said side rails in a first direction, said cross rail having at least a portion distinct from said side rails;

wherein said portion of said cross rail distinct from said side rails is divided into a plurality of cross rail elements, wherein first gaps are formed between said cross rail elements, and second gaps are formed between said side rails and said portion of said cross rail distinct from said side rails, said cross rail elements and said first and second gaps extending in said second direction, and wherein said air flow is directed from said upstream portion to said downstream portion via said first and second gaps.

11. A flying head slider as claimed in claim 10, wherein said gaps between said cross rail elements are an air path which are made to adjust said air flow.

* * * * *